May 13, 1941.  D. SILVERMAN  2,241,428
APPARATUS FOR UNDERWATER SEISMIC SURVEYING
Filed June 28, 1938  3 Sheets-Sheet 1
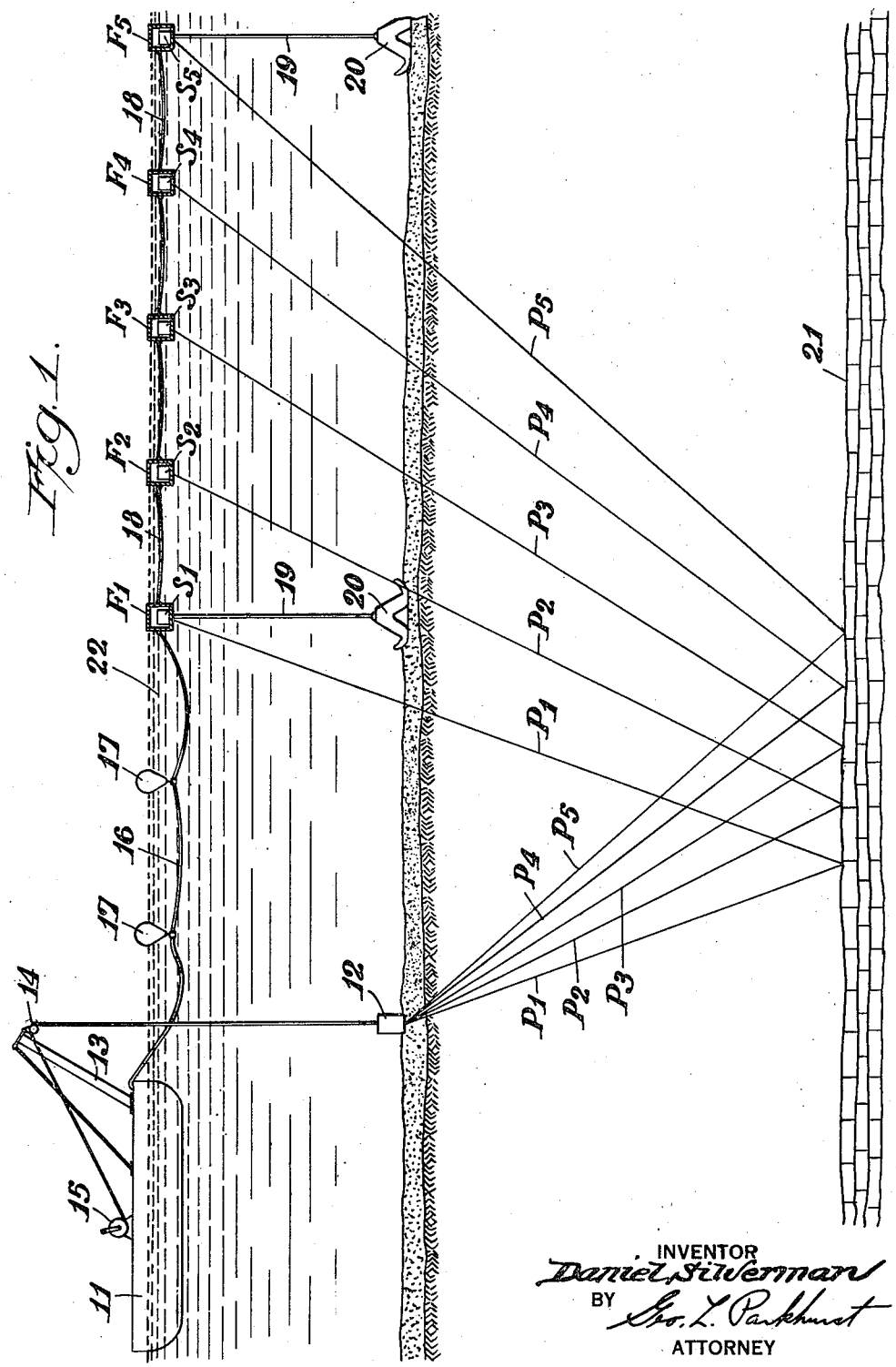
INVENTOR
Daniel Silverman
BY
Geo. L. Pankhurst
ATTORNEY

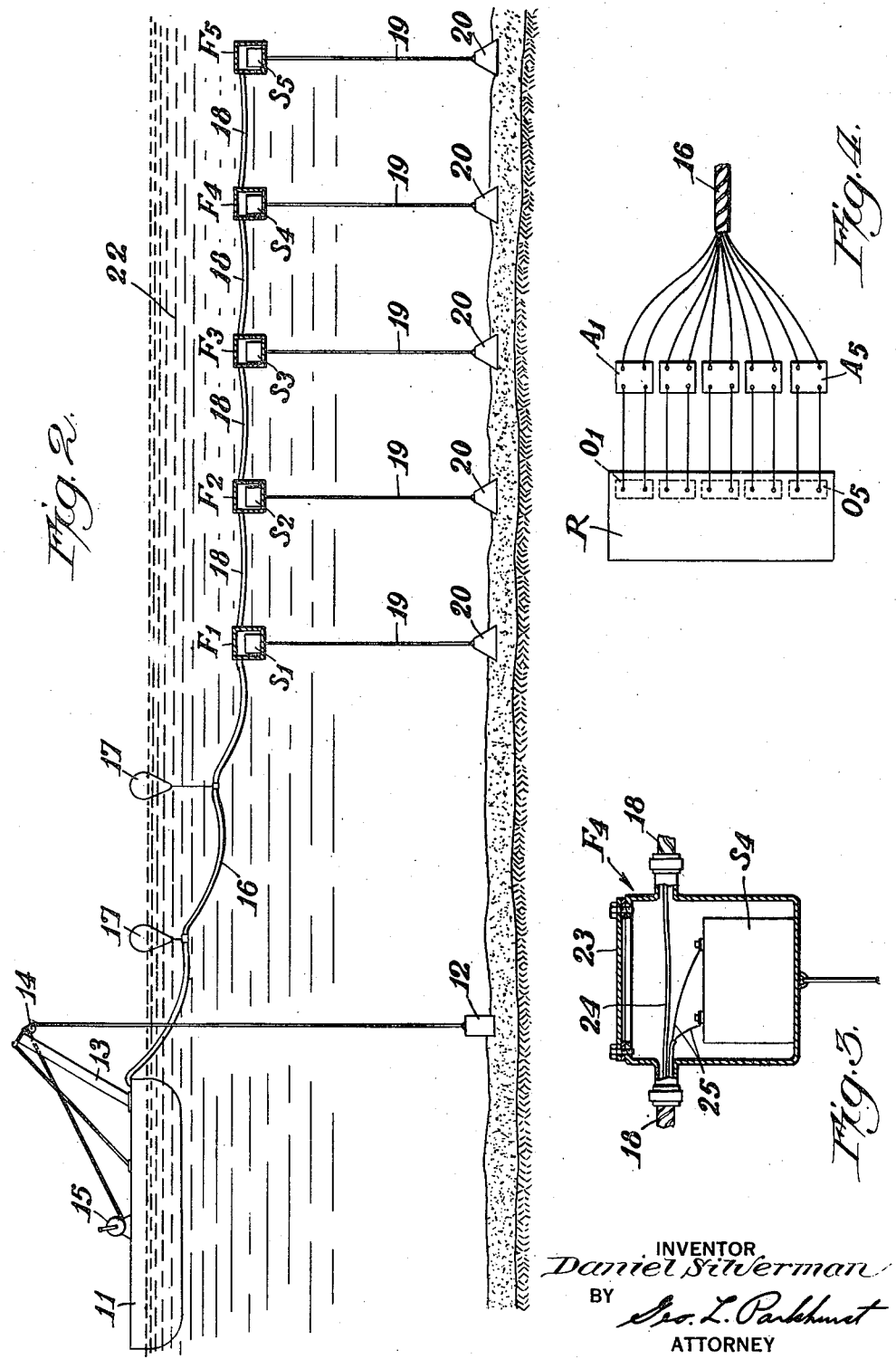

May 13, 1941. D. SILVERMAN 2,241,428
APPARATUS FOR UNDERWATER SEISMIC SURVEYING
Filed June 28, 1938 3 Sheets-Sheet 3
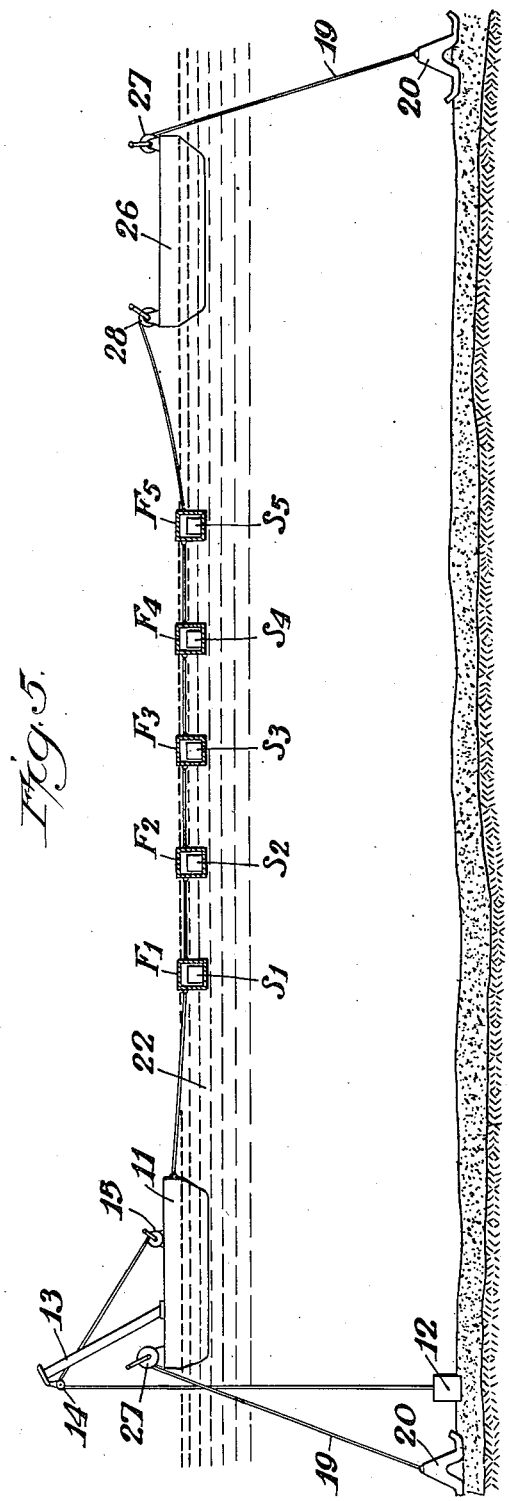
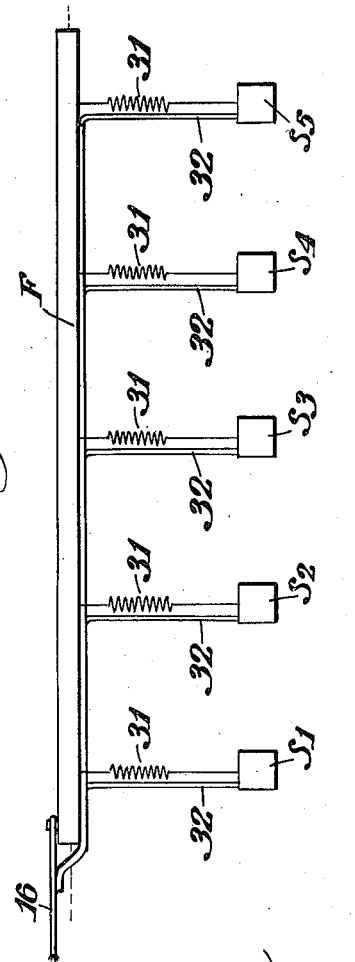
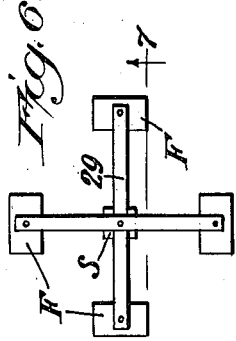
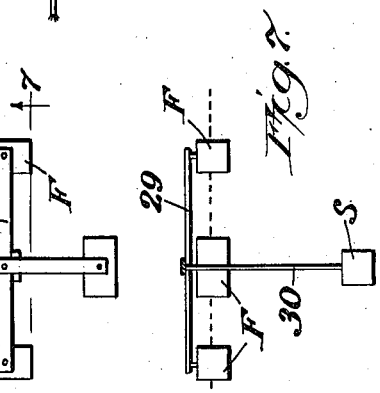
INVENTOR
Daniel Silverman
BY
Geo. L. Parkhurst
ATTORNEY Patented May 13, 1941

2,241,428

UNITED STATES PATENT OFFICE 2,241,428

APPARATUS FOR UNDERWATER SEISMIC SURVEYING

Daniel Silverman, Tulsa, Okla., assignor to Stanolind Oil and Gas Company, Tulsa, Okla., a corporation of Delaware Application June 28, 1938, Serial No. 216,254

11 Claims. (Cl. 181—0.5)

This invention relates to apparatus for seismic surveying and more particularly to apparatus for seismic surveying in areas covered by water.

The art of surveying by the use of seismic waves has achieved very considerable importance and various methods and apparatus for conducting seismic surveying operations are well-known to the art. The great bulk of this seismic surveying has been conducted on land. However, a considerable amount of such work has been conducted in very shallow water in coastal regions. In conducting seismic surveying operations in relatively shallow water, for instance up to 10 or 15 feet in depth, it has been the practice to lower the explosive charge to the bottom of the body of water and likewise to lower the seismometers to the floor of the body of water and then carry out operations in much the same manner as in land operations. However, this technique is not entirely satisfactory for operations conducted in relatively deep water, for instance water at least 25 feet and especially water at least 50 feet in depth.

In these deep water operations it becomes troublesome and time-consuming to lower each of a large number of seismometers to the bottom of a body of water and, moreover, there is always some uncertainty as to the exact position of these seismometers on the floor of the body of water concerned. This uncertainty as to the exact position obviously results in faulty determinations.

My invention has to do with these deep water seismic surveying operations and has as one of its principal objects the provision of means whereby the seismometers can be placed at or near the surface of the water. A further object of the invention is to provide means whereby deep water seismic surveying can be carried out more expeditiously and more accurately than heretofore. Another object of the invention is to provide means whereby deep water seismic surveying can be accomplished with an economical use of energy and with a minimum of disturbance due to direct waves. Still further objects, advantages and uses of my invention will become apparent as the description thereof proceeds.

The invention will now be described with particular reference to the accompanying drawings which form a part of this specification and should be read in conjunction therewith.

In the drawings:

Figure 1 is a simplified and idealized diagram showing one form of apparatus in accordance with my invention;

Figure 2 is a similar diagram showing a modification of the apparatus of Figure 1;

Figure 3 is a diagrammatic elevation showing in detail one of the floats of Figures 1 and 2;

Figure 4 is a diagram showing the amplification and recording apparatus used in connection with my invention;

Figure 5 is a diagram illustrating an apparatus alternative to those of Figures 1 and 2;

Figure 6 is a plan view illustrating a type of seismometer float which can be used in conjunction with my invention;

Figure 7 is an elevation taken along the line 7—7 of Figure 6; and

Figure 8 is a diagrammatic elevation illustrating a device for supporting a plurality of seismometers from a single elongated float.

In the various figures corresponding parts are designated by corresponding numbers and letters.

Turning more particularly to Figure 1, it will be seen that seismic surveying operations are conducted from a barge 11. This barge is equipped with the necessary recording and control apparatus which is not shown in detail. It is also equipped with means for lowering and firing the explosive charge necessary to generate artificial seismic waves and is further equipped with the necessary surveying equipment to determine and record the positions of the explosive charge and the seismometers.

As shown, the explosive charge contained in a weighted watertight container 12, is lowered by means of boom 13, pulley 14 and hoist 15 to the bottom of the body of water concerned and is fired by means not shown. Drill holes can, of course, be used as in conventional land operations but this is not usually necessary. The explosive charge is in general very small, for instance less than a pound of dynamite, so that the disturbance of the seismometers by the direct water waves is small even when the charge is exploded on the ocean floor. Moreover, this disturbance will have largely subsided by the time the seismic waves reflected from the deep formations are received.

Attached to barge 11 is a tow line 16 which contains, or is accompanied by, the necessary electric conductors as will hereinafter appear. This tow line can suitably be equipped with buoys 17 attached to the line between the barge and the seismometers. Connected to this tow line are a plurality of spaced seismometers $S_1 \ldots S_5$ within corresponding floats $F_1 \ldots F_5$. These floats are connected to each other by flexible tow lines 18 equipped with the necessary electric conductors. These tow lines are non-rigid so as to make the movements of the various floats and their seismometers independent of each other.

The seismometers can be placed at any appropriate interval, for instance a 50 foot spacing, although this interval can be varied in accordance with principles well known to those skilled in the art. The seismometer nearest the barge can likewise be at an appropriate distance from it, for instance 250 feet. Any desired number of seismometers can be used although I prefer to use at least five as shown. The number can be extended up to 20 or more if desired.

In the form shown in Figure 1, the end seismometers $S_1$ and $S_5$ or their respective floats are connected by anchor lines 19 to anchors 20 which serve to hold them in place. When a long string of seismometers is used anchors at intermediate points become desirable.

Operating as shown in Figure 1, an explosive charge in container 12 is fired and seismic waves pass downward into the earth formations underlying the body of water and are reflected by various reflecting formations of which the reflecting formation 21 is shown. Reflected waves from the point of origin pass by paths $P_1 \ldots P_5$ to seismometers $S_1 \ldots S_5$ and the effects of these reflected waves are recorded by means of suitable equipment on barge 11. As shown in Figure 1, reflecting formation 21 is located very close to the bottom of the body of water but in practice this is not commonly the case.

After conducting operations at one particular point, the array of seismometers shown in Figure 1 can be towed along with barge 11 to the next location where the operation can be repeated.

Anchor lines 19 should be of such length that the seismometers attached to them will be held firmly in place by the taut lines.

In Figure 2 the apparatus is similar with two exceptions. One exception is that anchor lines 19 and anchors 20 are used for each of the seismometers instead of only for the end seismometers. Secondly, anchor lines 19 are of such length that seismometers $S_1 \ldots S_5$ do not extend to the surface of the body of water 22 but rather are held at a point below the lower limit of effective surface water wave disturbance, for instance at a point at least 10 feet below the surface. This arrangement is advantageous in avoiding wave disturbance since although the low frequency vibrations occasioned by surface wave motion can readily be filtered out, surface wave motion nevertheless causes uncertainty as to the exact position of the seismometers and thereby introduce inaccuracies. On the other hand, the arrangement of Figure 2 has certain important advantages over an arrangement in which the seismometers are lowered to the floor of the body of water concerned. For one thing the seismometers extend sufficiently close to the surface so that their positions can be determined visually. Moreover, operations can be conducted more quickly than when it is necessary to lower each seismometer to the floor of the body of water.

Operating in accordance with Figure 2, the seismometers can be towed to a new position by means of tow line 16 or they can be raised and lowered independently.

It will be understood that instead of placing the seismometers within floats, as shown in Figures 1 and 2, they can be mounted on or suspended from the floats as will hereinafter appear. However, a suitable arrangement in accordance with Figures 1 and 2 is shown in Figure 3. In Figure 3 seismometer $S_4$, which happens to be the one shown in detail, is suspended within float $F_4$ equipped with air-tight cover 23. The two electric conductors 24 leading from seismometer $S_5$ pass into float $F_4$ from the right hand tow line 18 and through the float and out through the left hand tow line 18. Insulated conductors 25 from seismometer $S_4$ likewise pass into tow line 18 and ultimately all of these pass to the amplifying and recording apparatus contained in barge 11.

This amplifying and recording equipment is shown in a very diagrammatic fashion in Figure 4. Tow line 16 containing the necessary seismometer leads enters the barge and the leads pass to amplifiers $A_1 \ldots A_5$ from which the amplified electric currents pass to oscillograph element $O_1 \ldots O_5$ contained in recorder R which can be of the usual type adapted to make a photographic record of the electrical waves corresponding to the seismic waves received by the seismometers.

As shown in Figure 5, two boats or barges can be used instead of one. Barge 11 can be used for firing the explosive charge as in Figures 1 and 2. A second barge 26 can be used and the recording equipment can if desired be placed on it. By using two barges the seismometers can be stretched between them and held in place by anchoring the barges rather than by anchoring the seismometer floats. This facilitates movement to a new location. The barges are anchored as shown by anchors 20 attached to anchor lines 19 which in turn lead to winches 27 on barges 11 and 26. The seismometers are additionally held in place by a winch 28 attached to the seismometer tow line. This winch can, of course, be located on either barge or one can be used on each barge.

An advantageous alternative form of float for suspending the seismometers is shown in Figures 6 and 7. At least three floats, four in the form shown, are spaced from each other but connected together and the seismometer is mounted on or preferably suspended from the assembly. The floats are preferably spaced about half the wave length of typical surface waves. Much of the effect of surface disturbances is thus eliminated since the position of the center of the assembly remains relatively constant.

In Figures 6 and 7 four floats F are connected by arms 29 and seismometer S is suspended from the center of this assembly by support 30 which is preferably a resilient or flexible member. Seismometer S can be mounted below the region of surface water wave disturbance.

Figure 8 shows a device in which seismometers $S_1 \ldots S_5$ are all supported from a common float F by means of resilient members 31 which preferably have natural frequencies of a lower order of magnitude than the frequencies of the seismic waves. These resilient supports insure that the seismometer will be affected independently by the seismic waves. As in Figures 2 and 7 the seismometers can be positioned below the region of effective surface water wave disturbance. Insulated conductors 32 lead from each of the seismometers to tow line 16. The device of Figure 8 is readily towable and the seismometer spacing is rigidly controlled. This seismometer assembly can be used with one barge as in Figure 1 or with two as in Figure 5.

My invention has been described with particular reference to certain specific embodiments thereof but it will be understood that these are by way of illustration and not by way of limitation and various modifications will be apparent to those skilled in the art. Thus, for instance, while my invention is described in connection with seismic prospecting by the reflection method, it will be obvious that it is likewise adaptable to seismic prospecting by the refraction method. Further, while I have shown the explosive charge being exploded at the bottom of the body of water concerned and while this is highly desirable, it will be apparent that the explosion can be generated at a somewhat higher level, but it is important that it be generated at a relatively deep level as compared with the level of the seismometers or other receivers. My invention is therefore limited only to the scope of the appended claims which should be construed as broadly as the prior art will permit.

I claim:

1. Apparatus for seismic surveying in areas covered by deep water comprising means for generating seismic waves at the bottom of a deep body of water, and means for receiving said seismic waves at at least five horizontally spaced points near the surface of said body of water.

2. Apparatus for seismic surveying geological formations disposed beneath the bottom of a body of water, comprising means for generating seismic waves near the bottom of said body of water, means for receiving seismic waves which have penetrated to said geological formations, said means comprising a plurality of horizontally spaced seismometers disposed near the surface of said body of water, and means for recording the effect of the seismic waves received at said seismometers.

3. Apparatus for seismic surveying in areas covered by deep water comprising means for generating seismic waves at the bottom of a body of water, a plurality of horizontally spaced means for receiving said seismic waves near the surface of said body of water, and non-rigid means for towing said receiving means to a new location.

4. Apparatus for seismic surveying geological formations underlying deep water comprising means for generating seismic waves near the bottom of said body of water, an array of horizontally spaced seismometers disposed near the surface of said body of water, non-rigid means connecting the seismometers of said array, means for anchoring said array of seismometers in place, and means for moving said array of seismometers to a new location.

5. In apparatus for surveying underwater geological formations, an array of at least five horizontally spaced floating seismometers, means non-rigidly connecting said floating seismometers, means for towing said array of floating seismometers, and means for generating seismic waves at a level substantially lower than the level of said seismometers.

6. In apparatus for seismic surveying geological formations disposed beneath the bottom of a body of water, comprising means for generating seismic waves, a plurality of spaced means for receiving seismic waves which have penetrated to said geological formations, and means for recording the effects of the received seismic waves, the improvement which comprises disposing said plurality of spaced receiving means in a substantially horizontal line relatively near the surface of said body of water, and disposing said generating means substantially at the bottom of said body of water.

7. In apparatus for surveying at least one geological formation disposed beneath the floor of a body of water, an array of at least five horizontally spaced floating seismic wave receivers, means associated with said receivers for controlling the vertical positions of said receivers, flexible means connecting the receivers of said array, and means for generating seismic waves substantially at the bottom of said body of water.

8. In apparatus for seismic surveying in a region covered by a deep body of water, an array of horizontally spaced floating seismic wave receivers, flexible means connecting the receivers of said array, anchoring means connected with said array of receivers and retaining said receivers at a level substantially above the bottom of said body of water but substantially below the lower level of effective wave action, and means for generating seismic waves in the vicinity of the bottom of said body of water and at a level substantially lower than the level of said receivers.

9. Apparatus for seismic surveying in regions covered by deep water comprising means for generating seismic waves substantially at the bottom of said water, means for receiving seismic waves at a plurality of substantially horizontally spaced points located at a higher level in said water, and individual float means supporting each of said receiving means.

10. Apparatus for seismic surveying in regions covered by deep water comprising means for generating seismic waves at a low level in said water, means for receiving seismic waves at a plurality of substantially horizontally spaced points located at a higher level in said water, means supporting said receiving means, each of said supporting means comprising a float assembly made up of a plurality of floats and rigid connections between said floats, and connecting means supporting one of said receiving means from each of said float assemblies.

11. Apparatus for seismic surveying in regions covered by deep water comprising means for generating seismic waves at a low level in said water, means for receiving seismic waves at a plurality of substantially horizontally spaced points located at a higher level in said water, and means for supporting said receiving means, said supporting means comprising an elongated float and a plurality of spaced resilient supports connected with said float and with said receiving means.

DANIEL SILVERMAN.